(12) United States Patent
Agarwal et al.

(10) Patent No.: US 11,403,656 B1
(45) Date of Patent: Aug. 2, 2022

(54) METHOD AND APPARATUS FOR IDENTIFYING TRENDING PROMOTIONS

(71) Applicant: Groupon, Inc., Chicago, IL (US)

(72) Inventors: Nipun Agarwal, Mountain View, CA (US); Rajesh Parekh, San Jose, CA (US)

(73) Assignee: GROUPON, INC., Chicago, IL (US)

(*) Notice: Subject to any disclaimer, the term of this patent is extended or adjusted under 35 U.S.C. 154(b) by 0 days.

(21) Appl. No.: 14/839,490

(22) Filed: Aug. 28, 2015

Related U.S. Application Data

(60) Provisional application No. 62/043,109, filed on Aug. 28, 2014.

(51) Int. Cl.
*G06Q 30/00* (2012.01)
*G06Q 30/02* (2012.01)

(52) U.S. Cl.
CPC .................. *G06Q 30/0211* (2013.01)

(58) Field of Classification Search
CPC ................................................ G06Q 30/0242
See application file for complete search history.

(56) References Cited

U.S. PATENT DOCUMENTS

| | | | | |
|---|---|---|---|---|
| 5,974,396 A | * | 10/1999 | Anderson | G06Q 30/02 705/14.25 |
| 6,129,274 A | * | 10/2000 | Suzuki | G06Q 20/363 705/16 |
| 7,013,290 B2 | * | 3/2006 | Ananian | G06Q 30/02 705/26.42 |

(Continued)

FOREIGN PATENT DOCUMENTS

| | | | | |
|---|---|---|---|---|
| JP | 2002024586 A | * | 1/2002 | |
| WO | WO-2008058195 A2 | * | 5/2008 | ............. G06Q 30/02 |
| WO | WO-2009143419 A1 | * | 11/2009 | ............. G06Q 30/02 |

OTHER PUBLICATIONS

Priya Raghubir. Coupons in context: discounting prices or decreasing profits? (Journal of Retailing 80 2004) (Year: 2004).*

(Continued)

*Primary Examiner* — James A Reagan
(74) *Attorney, Agent, or Firm* — Alston & Bird LLP

(57) ABSTRACT

A method, apparatus and computer program product are provided for generation of analytic data. An example embodiment includes a method for identifying trending items based on electronically generated velocity metrics derived from transaction data. The method includes performing at least one electronic transaction between a consumer and the promotion and marketing service to offer, via the electronic transaction, at least one promotion to the consumer, storing a set of transaction data in a memory, the set of transaction data comprising electronic data indicating the at least one transaction, determining, via processing circuitry, one or more velocity metrics for a plurality of promotions from the set of transaction data, determining at least one trending promotion from the plurality of promotions based on the velocity metrics, generating, via the processing circuitry, an electronic communication comprising the at least one trending promotion, and transmitting, via communications circuitry, the electronic communication.

19 Claims, 4 Drawing Sheets

(56) References Cited

U.S. PATENT DOCUMENTS

| | | | | |
|---|---|---|---|---|
| 8,260,645 | B2* | 9/2012 | Banerjee | G06Q 40/02 705/7.11 |
| 8,781,923 | B2* | 7/2014 | Pitroda | G06Q 20/3227 705/30 |
| 9,215,423 | B2* | 12/2015 | Kimble | H04N 21/6582 |
| 9,317,849 | B2* | 4/2016 | Pitroda | G06Q 20/045 |
| 9,727,868 | B2* | 8/2017 | Faith | G06Q 30/0269 |
| 9,984,379 | B2* | 5/2018 | Faith | G06Q 30/0202 |
| 10,313,755 | B2* | 6/2019 | Kimble | H04N 7/17318 |
| 10,546,269 | B1* | 1/2020 | Gaurav | G06Q 10/087 |
| 11,012,749 | B2* | 5/2021 | Kimble | H04N 21/44224 |
| 2002/0116249 | A1* | 8/2002 | Ellinger | G06Q 30/02 705/7.33 |
| 2004/0249712 | A1* | 12/2004 | Brown | G06Q 30/0217 705/14.19 |
| 2005/0149433 | A1* | 7/2005 | Rothstein | G06Q 40/025 705/38 |
| 2006/0282323 | A1* | 12/2006 | Walker | G07F 5/18 705/14.14 |
| 2007/0094066 | A1* | 4/2007 | Kumar | G06Q 10/04 706/61 |
| 2007/0094067 | A1* | 4/2007 | Kumar | G06Q 30/0201 705/26.2 |
| 2008/0059384 | A1* | 3/2008 | Eglen | G06Q 30/02 705/400 |
| 2008/0077459 | A1* | 3/2008 | Desai | G06Q 10/06314 705/7.24 |
| 2010/0250338 | A1* | 9/2010 | Banerjee | G06Q 40/12 705/16 |
| 2011/0153393 | A1* | 6/2011 | Raff | G06Q 30/02 705/7.42 |
| 2013/0290172 | A1* | 10/2013 | Mashinsky | G06Q 20/12 705/39 |
| 2014/0081722 | A1* | 3/2014 | Schacht | G06Q 30/0207 705/14.15 |
| 2014/0324677 | A1* | 10/2014 | Walraven | G06Q 20/4016 705/39 |
| 2015/0170196 | A1* | 6/2015 | Meir | G06Q 30/0242 705/14.41 |
| 2020/0219042 | A1* | 7/2020 | Gaurav | G06Q 10/087 |

OTHER PUBLICATIONS

Bartholdi et al. Warehouse & Distribution Science. (Jan. 11, 2011). Retrieved online Oct. 24, 2020. https://www.scl.gatech.edu/sites/default/files/downloads/gtscl-warehouse_science_bartholdi.pdf (Year: 2011).*

McKinsey and Company. "Big data: The next frontier for innovation, competition, and productivity." (Jun. 2011). Retrieved online Mar. 16, 2022. https://bigdatawg.nist.gov/pdf/MGI_big_data_full_report.pdf (Year: 2011).*

Carla Mounir Issa. "Data warehouse applications in modern day business." (2002). Retrieved online Mar. 16, 2022. https://scholarworks.lib.csusb.edu/cgi/viewcontent.cgi?article=3149&context=etd-project (Year: 2002).*

U.S. Appl. No. 13/930,519, filed Jun. 28, 2013; In re: Ayars et al., entitled *Method and Apparatus for Generating an Electronic Communication*.

U.S. Appl. No. 13/930,527, filed Jun. 28, 2013; In re: Ayars et al., entitled *Method and Apparatus for Generating an Electronic Communication*.

U.S. Appl. No. 13/930,532, filed Jun. 28, 2013; In re: Ayars et al., entitled *Method and Apparatus for Generating an Electronic Communication*.

U.S. Appl. No. 14/219,349, filed Mar. 19, 2014; In re: Ayars et al., entitled *Method and Apparatus for Generating an Electronic Communication*.

U.S. Appl. No. 14/453,179, filed Aug. 6, 2014; In re: Ayers et al., entitled *Method and Apparatus for Generating an Electronic Communication*.

* cited by examiner

METHOD AND APPARATUS FOR IDENTIFYING TRENDING PROMOTIONS

CROSS REFERENCE TO RELATED APPLICATIONS

This application claims priority to and is a nonprovisional application of U.S. Provisional Application No. 62/043,109, filed Aug. 28, 2014, which is incorporated by reference herein in its entirety

TECHNOLOGICAL FIELD

Example embodiments of the present invention relate generally to providing content for electronic marketing communications and, more particularly, to methods, systems, and apparatuses for identifying trending promotions for inclusion in electronic marketing communications.

BACKGROUND

The applicant has discovered problems with current methods, systems, and apparatuses for determining trending promotions and providing said trending promotions. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product identify trending promotions. Example embodiments may include methods, systems, apparatuses, and the like that determine promotion velocity metrics based on promotion transaction data. The promotion velocity metrics may be employed to identify promotions that meet or exceed certain threshold values. Promotions that meet or exceed these threshold values may be evaluated to determine if those promotions meet certain criteria for selection as a trending promotion. For example, prior to selection as a trending promotion, embodiments may ensure that a sufficient quantity of the promotion is available, that the promotion has a sufficient time period remaining, or the like.

An example embodiment includes a method for identifying trending promotions based on electronically generated velocity metrics derived from transaction data. The method includes performing, via a promotion and marketing service, at least one electronic transaction between a consumer and the promotion and marketing service to offer, via the electronic transaction, at least one promotion to the consumer, storing a set of transaction data in a memory, the set of transaction data comprising electronic data indicating the at least one transaction, determining, via processing circuitry, one or more velocity metrics for a plurality of promotions from the set of transaction data, determining, via the processing circuitry, at least one trending promotion from the plurality of promotions based on the velocity metrics, generating, via the processing circuitry, an electronic communication comprising the at least one trending promotion, and transmitting, via communications circuitry, the electronic communication.

The one or more velocity metrics may include a change in a rate of transactions over a particular time period. A particular promotion may be identified as a trending promotion in response to the particular promotion having a change in a rate of transactions greater than a threshold value. The method may include determining the at least one trending promotion based at least in part on the at least one trending promotion being associated with at least one of a particular location or a particular promotion category. The at least one trending promotion may be determined in response to receiving a trending promotion inquiry. The method may include providing the at least one trending promotion to an entity from which the trending promotion inquiry was received. The method may include filtering a plurality of identified trending promotions including the at least one trending promotion prior to generating the electronic communication to remove invalid promotions. Filtering the plurality of identified trending promotions may include removing promotions that have less than a threshold time or quantity remaining.

Another embodiment provides a non-transitory computer readable storage medium including program instructions that, when executed by a processor, configure the processor to cause an apparatus to perform, via a promotion and marketing service, at least one electronic transaction between a consumer and the promotion and marketing service to offer, via the electronic transaction, at least one promotion to the consumer, to store a set of transaction data in a memory, the set of transaction data comprising electronic data indicating the at least one transaction, to determine one or more velocity metrics for a plurality of promotions from the set of transaction data, to determine at least one trending promotion from the plurality of promotions based on the velocity metrics, to generate an electronic communication comprising the at least one trending promotion, and to transmit the electronic communication.

The one or more velocity metrics may include a change in a rate of transactions over a particular time period. A particular promotion may be identified as a trending promotion in response to the particular promotion having a change in a rate of transactions greater than a threshold value. The program instructions may further cause the processor to configure the apparatus to determine the at least one trending promotion based at least in part on the at least one trending promotion being associated with at least one of a particular location or a particular promotion category. The at least one trending promotion may be determined in response to receiving a trending promotion inquiry. The program instructions may further cause the processor to configure the apparatus to provide the at least one trending promotion to an entity from which the trending promotion inquiry was received. The instructions may further cause the processor to configure the apparatus to filter a plurality of identified trending promotions including the at least one trending promotion prior to generating the electronic communication to remove invalid promotions. Filtering the plurality of identified trending promotions further may include removing promotions that have less than a threshold time or quantity remaining.

Embodiments also include an apparatus for generating electronic communications comprising a processor and a memory. The apparatus is configured to perform at least one electronic transaction between a consumer and a promotion and marketing service to offer, via the electronic transaction, at least one promotion to the consumer, to store a set of transaction data in the memory, the set of transaction data comprising electronic data indicating the at least one transaction, to determine one or more velocity metrics for a plurality of promotions from the set of transaction data, to determine at least one trending promotion from the plurality of promotions based on the velocity metrics, to generate an electronic communication comprising the at least one trending promotion, and to transmit via communications circuitry, the electronic communication.

The one or more velocity metrics may include a change in a rate of transactions over a particular time period. A particular promotion may be identified as a trending promotion in response to the particular promotion having a change in a rate of transactions greater than a threshold value. The apparatus may be further configured to determine the at least one trending promotion based at least in part on the at least one trending promotion being associated with at least one of a particular location or a particular promotion category. The at least one trending promotion may be determined in response to receiving a trending promotion inquiry. The apparatus may be further configured to provide the at least one trending promotion to an entity from which the trending promotion inquiry was received. The apparatus may be further configured to filter a plurality of identified trending promotions including the at least one trending promotion prior to generating the electronic communication to remove invalid promotions. Filtering the plurality of identified trending promotions may include removing promotions that have less than a threshold time or quantity remaining.

Embodiments also provide an apparatus for generating electronic communications comprising means for performing at least one electronic transaction between a consumer and a promotion and marketing service to offer, via the electronic transaction, at least one promotion to the consumer, means for storing a set of transaction data, the set of transaction data comprising electronic data indicating the at least one transaction, means for determining one or more velocity metrics for a plurality of promotions from the set of transaction data, means for determining at least one trending promotion from the plurality of promotions based on the velocity metrics, means for generating an electronic communication comprising the at least one trending promotion; and means for transmitting the electronic communication.

The one or more velocity metrics may include a change in a rate of transactions over a particular time period. A particular promotion may be identified as a trending promotion in response to the particular promotion having a change in a rate of transactions greater than a threshold value. The apparatus may include means for determining the at least one trending promotion based at least in part on the at least one trending promotion being associated with at least one of a particular location or a particular promotion category. The at least one trending promotion may be determined in response to receiving a trending promotion inquiry. The apparatus may include means for providing the at least one trending promotion to an entity from which the trending promotion inquiry was received. The apparatus may include means for filtering a plurality of identified trending promotions including the at least one trending promotion prior to generating the electronic communication to remove invalid promotions. Filtering the plurality of identified trending promotions may include removing promotions that have less than a threshold time or quantity remaining.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
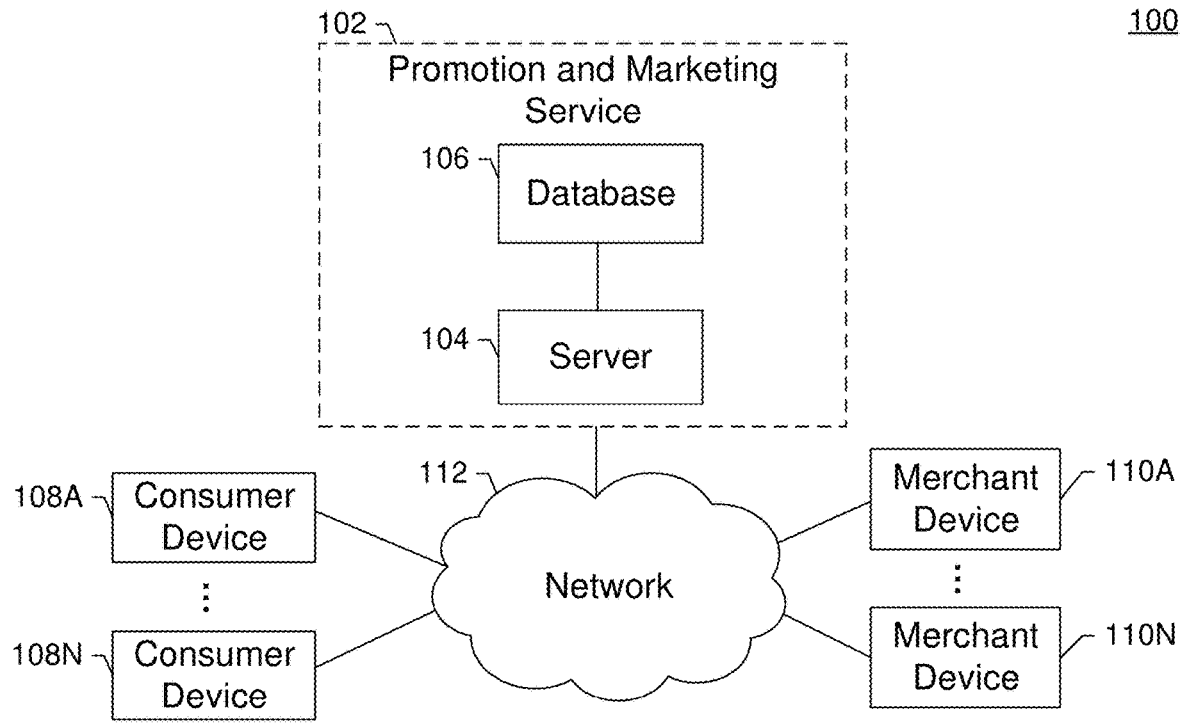
Figure 2:
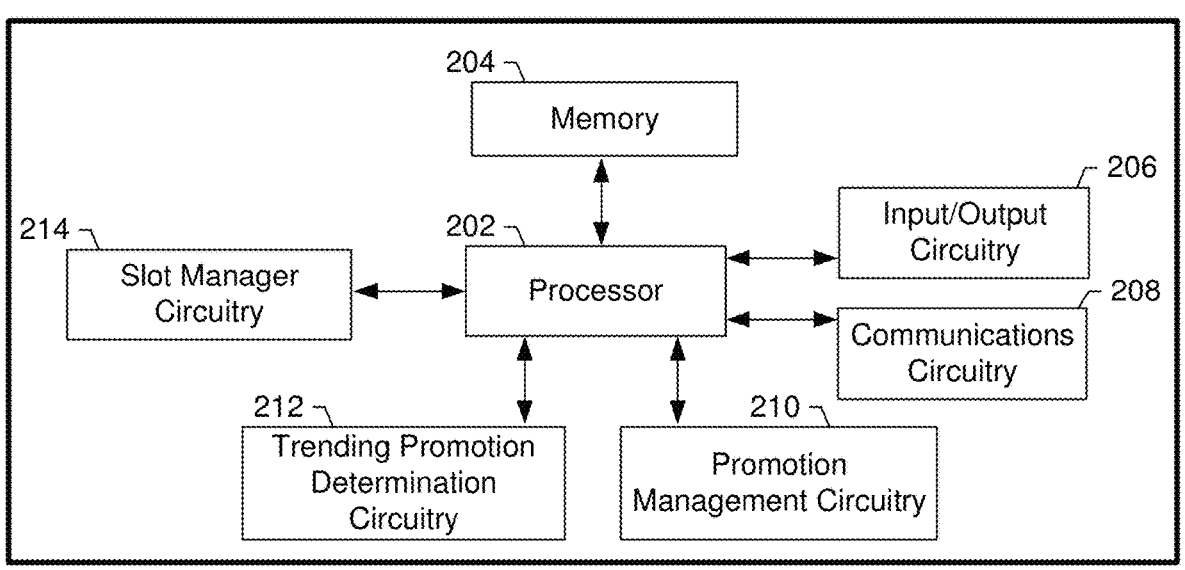
Figure 3:
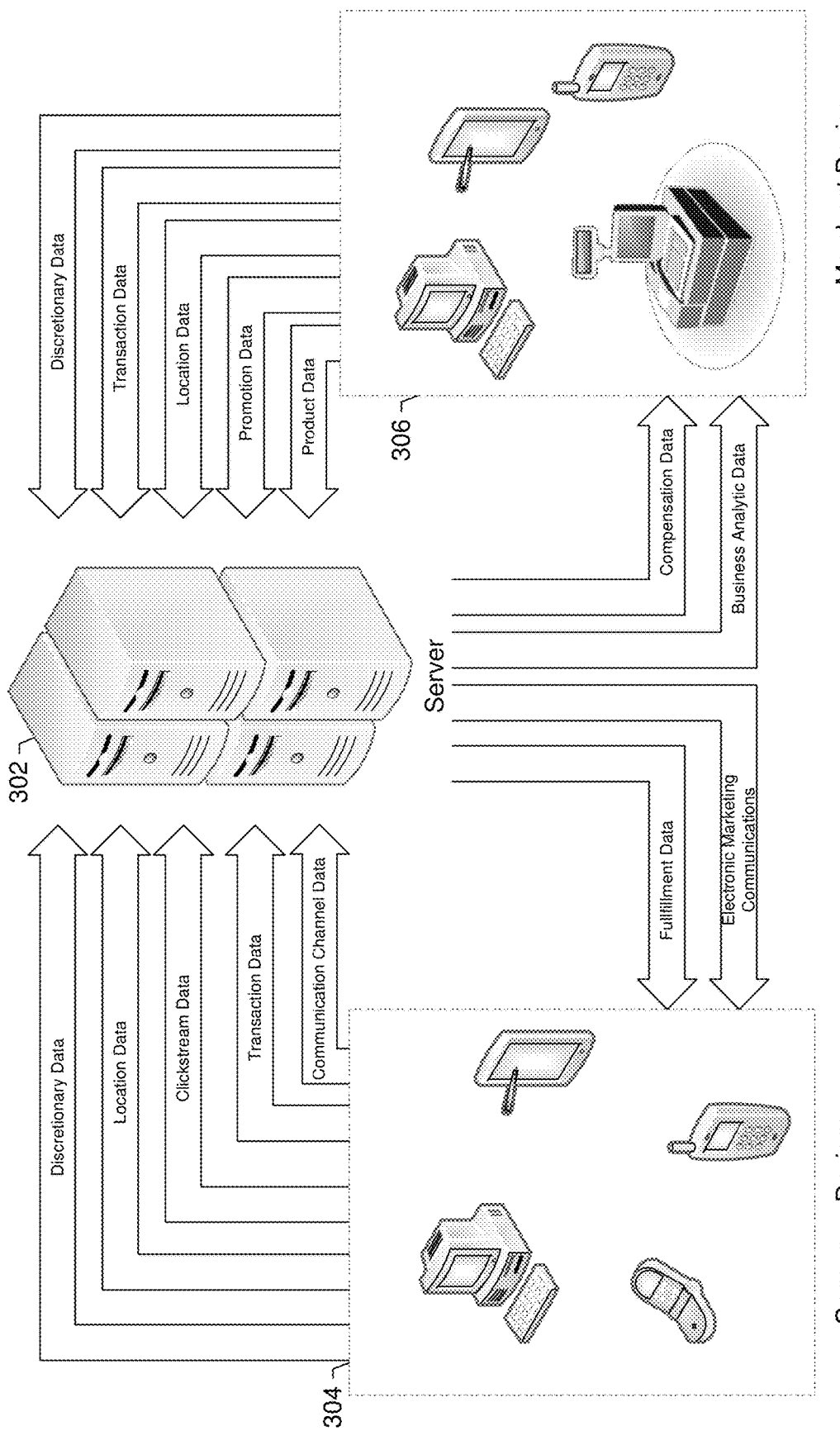
Figure 4:
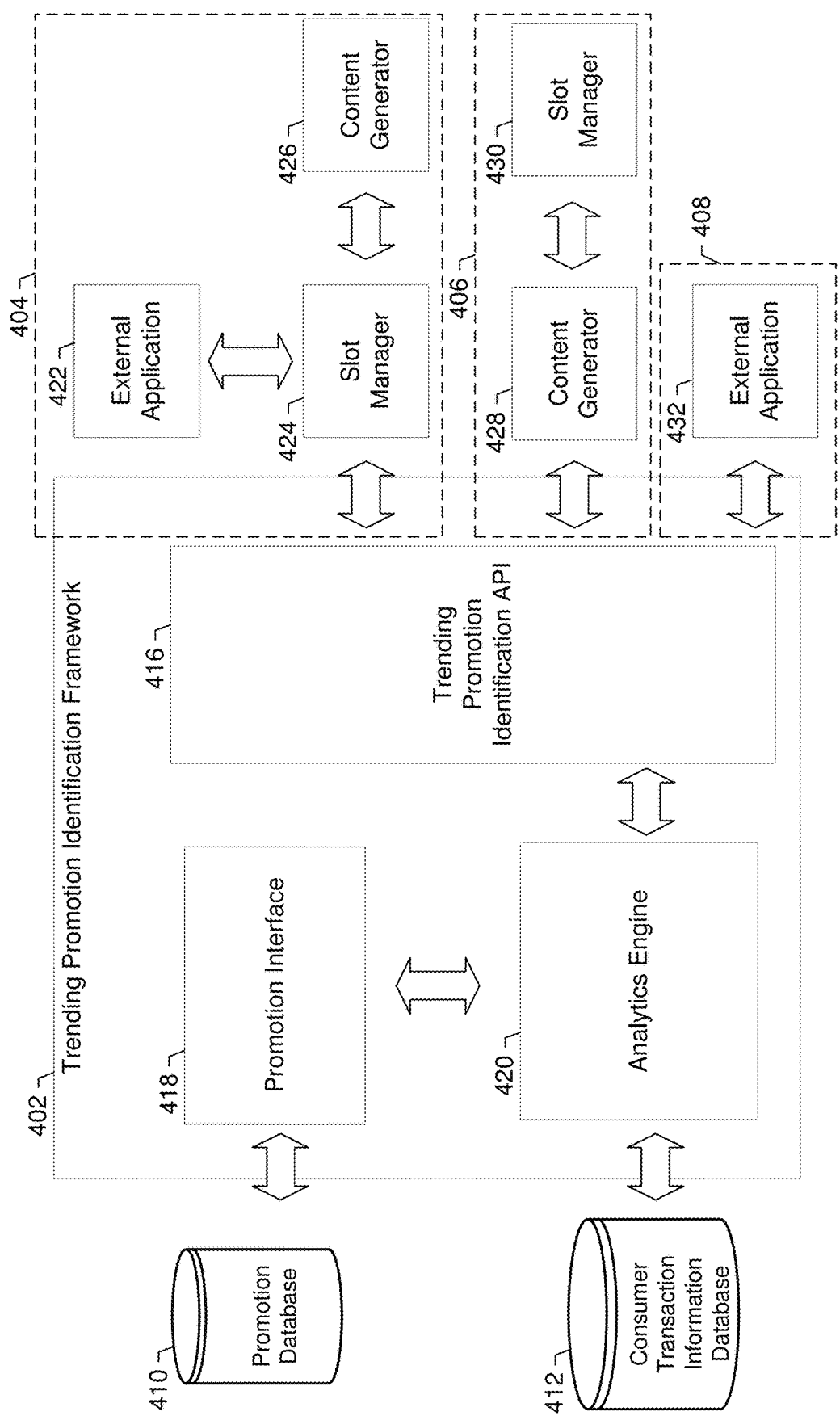
Figure 5:
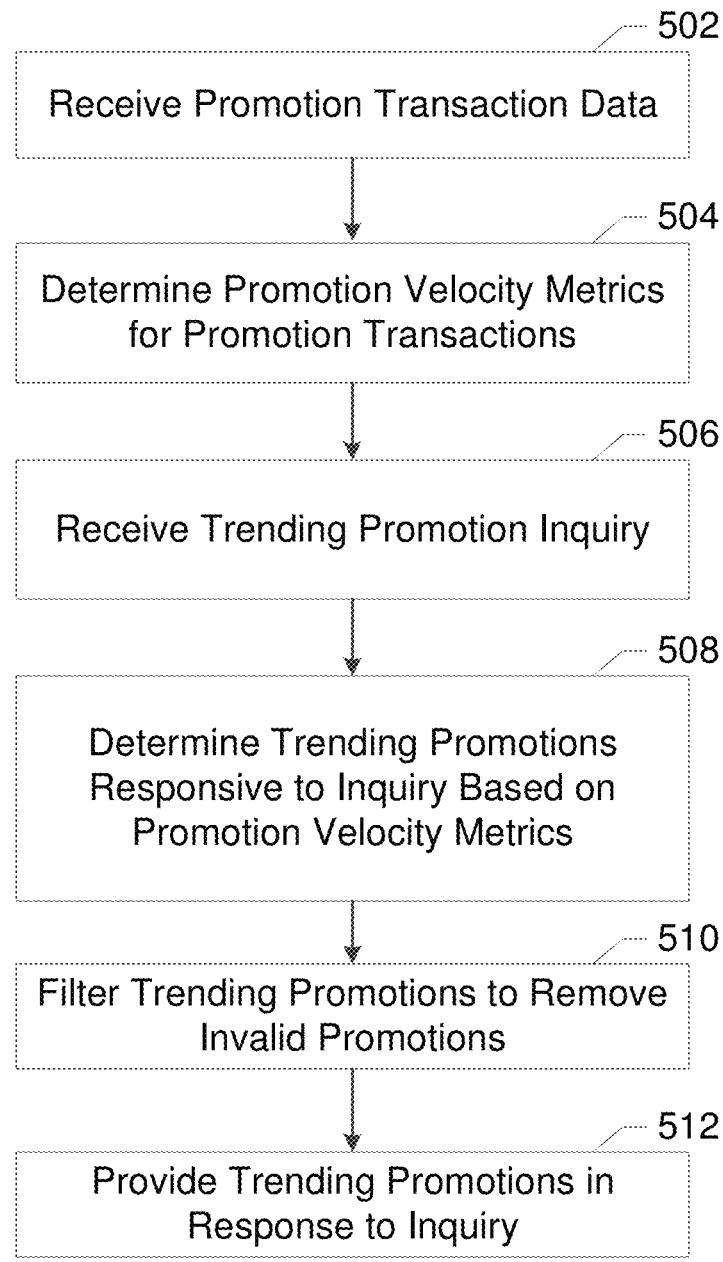

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a trending promotion determination engine using special-purpose circuitry in accordance with some example embodiments of the present invention;

FIG. 3 illustrates an example data flow among a consumer device, a server, and a merchant device in accordance with some example embodiments of the present invention;

FIG. 4 illustrates an example data flow interaction between elements of an example device for implementing a trending promotion determination engine in accordance with some example embodiments of the present invention; and FIG. 5 illustrates a flowchart describing example operations for providing trending promotions in accordance with some example embodiments of the present invention.

DETAILED DESCRIPTION

Overview

Various embodiments of the present invention are directed to improved apparatuses, methods, and computer readable media for identifying trending promotions for inclusion in electronic marketing communications. In this regard, embodiments of the present invention provide systems, devices, and frameworks for analyzing electronic marketing information and selecting one or more promotions as trending promotions based on transactions performed with respect to those promotions. In particular, some embodiments identify one or more velocity metrics associated with sales of the promotions. Promotions that meet or exceed certain thresholds for these velocity metrics may be selected as trending promotions. Embodiments may further filter selected promotions to ensure that certain other criteria are met for being identified as a trending promotion, such as a minimum inventory level remaining or a minimum amount of time before expiration of the promotion. It should also be readily appreciated that while embodiments described herein are generally described with respect to promotions, some embodiments could also be implemented to cover the sale of particular products, trips, or other goods and services offered by a promotion and marketing service.

Some embodiments further provide a trending promotion framework for identifying and reporting trending promotions is operable to receive trending promotion inquiries from other devices, systems, and/or circuitry. In response to these inquiries, embodiments may identify trending promotions. In particular, some embodiments provide a trending promotion identification application programming interface (API) that allows external devices, systems, and/or circuitry to submit trending promotion inquiries. For example, an external device or system may request one or more trending promotions selected from all available promotions. In another embodiment, an external device or system may request one or more trending promotions associated with a particular location (e.g., trending promotions associated with a particular zip code), trending promotions associated with a particular promotion category (e.g., restaurants, spas, jewelry stores), trending promotions associated with a particular promotion type (e.g., promotions redeemable for discounts, promotions redeemable for goods, promotions redeemable for services, promotions redeemable for trips), or the like.

In some embodiments, trending promotion inquiries may be received from a slot management infrastructure. In particular, a slot manager and/or slot manager circuitry may generate a trending promotion inquiry as part of generating an electronic marketing communication. The trending promotion framework may provide a trending promotion in response to the inquiry for inclusion in an outgoing electronic marketing communication. In some embodiments, the slot management infrastructure may further include one or more content generators selected and/or managed by the slot manager and/or slot manager circuitry. In some embodiments, the trending promotion inquiries may be received directly from the one or more content generators instead of from the slot manager and/or slot manager circuitry. Example embodiments of a slot manager infrastructure are described more fully in U.S. patent application Ser. Nos. 13/930,519, 13/930,527, 13/930,532, 14/219,349, 14/453,179, which are herein incorporated by reference in their entirety.

It should be readily appreciated that the embodiments of the methods, systems, devices, and apparatuses for providing trending promotions may be configured in various additional and alternative manners to provide trending promotions within the context of a promotion and marketing service as described herein.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the term "content generator" should be understood to include any method, process, application, algorithm, or the like that is operable to select content for an electronic marketing communication. For example, content generators may be "widgets", "apps", "applets" or any other software, hardware and/or method that, when executed or performed by a programmed computer, provides content for insertion into an electronic communication, such as by providing content to fill a slot of the electronic communication. Content generators may be associated with particular types of content. For example, content generators may be associated with only promotion content or non-promotion content, content generators may be associated with a particular type of promotion (e.g., a content generator for promotions redeemable for a particular good, a content generator for promotions redeemable for a particular discount value, or a content generator for promotions redeemable for a particular vacation), a particular type of merchant (e.g., a content generator for restaurant promotions, a content generator for spa treatment promotions, or a content generator for home remodeling promotions), a particular date (e.g., content generators for Valentine's Day, Tax Return day, the Fourth of July, or Labor Day), a particular season (e.g., content generators for ski trips in the Winter, and different content generators for beach trips in the summer), a particular location (e.g., a content generator for promotions in a particular zip code or state, or a content generator related to a specific latitude and longitude), a particular data gathering operation (e.g., a content generator to request a consumer's zip code, a content generator to request a consumer's favorite restaurant type), a particular notification type (e.g., a content generator to inform a consumer of the promotion and marketing service's privacy policy), a particular type of interest as express explicitly or implicitly by a user (e.g., filling out a questionnaire indicating "I like Italian food and luxury goods deals"), based on a user's relationship status (e.g., content generators for "Date Night" content for married couples with children), consumer social network activity (e.g., content generators that detect pages the user has "liked" and select content accordingly), or any other type of content that may be suitable for inclusion in an electronic communication.

Content generators may include content to be provided by the content generator, or the content may be stored external to the content generator and the content generator may access or provide access (i.e., by providing a database address, etc.) to the externally stored content. For example, a particular content generator may store a set of promotion parameters, images, and terms for a given promotion, and provide said parameters, images, and terms for use in an electronic communication, or the promotion parameters, images, and terms may be stored in a promotion database and the content generator may provide a reference to or address for the parameters, images, and terms for generation of an electronic communication.

Content generators may also include assignment preference logic. Content generators may have certain preferences for certain electronic communications or certain slots within a communication. For example, a content generator may include assignment preference logic that indicates a preference to be included in e-mail electronic communications rather than webpage electronic communications, or the content generator may include preference data that indicates a preference to be included in an electronic communication only when the content generator is assigned to the first slot displayed within the electronic communication.

In some embodiments, content generators may be created using an authoring tool or module. The authoring tool may allow for generation of content generators that select and/or provide content according to any method, process, or algorithm. For example, a content generator author may use the content authoring tool to write an algorithm that, when the content generator is executed, causes the content generator to offer a particular type of content or set of content to a slot manager for inclusion in an electronic communication. It should be understood that any process, system, tool, or algorithm could be employed to select the content within the content generator and that the instant application is not intended to be limited to a particular content generator, but rather describes a framework for integration of any user-defined content generator that is operable to communicate content to the slot generator.

Content generators may also include bid logic by which the content generator may determine a bid amount for a particular content slot. In this manner, content generators may use internal logic to identify how valuable a particular content slot is to the content generator for that particular slot, for that particular user, for that particular location, and/or at that particular time.

It should be appreciated that content generators as described herein are not static selections of particular content. For example, a slot manager module does not select particular content for insertion into particular slots of an electronic communication. Rather, a slot manager may select content generators that utilize their own respective internal logic to select content for their assigned slot(s).

As used herein, the terms "slot" and "content slot" should be understood to refer to a defined region of the electronic marketing communication into which content may be inserted. Slots may be defined by particular coordinates in an n-dimensional coordinate space (e.g., x and y coordinates establishing absolute positions within the electronic communication), a particular position relative to other slots within the electronic communication (e.g., display slot 1 at the top of the electronic communication, then slot 2, then slot 3, etc.), based on particular rules for the electronic communication (e.g., a title slot, a sidebar slot, a pop-up advertisement slot, a hover-over slot), or according to any other mechanism for dividing the electronic communication into one or more regions. Slots may also include slot metadata. For example, slots may be associated with a particular type of content (e.g., a promotion content slot and a non-promotion content slot). Alternatively, slots may be operable to receive any type of content. Slots may also include specific content generators that are eligible or ineligible for use in the slot, such that only eligible content generators may be permitted to submit bids for the slot, or ineligible content generators may be prevented from bidding on the slot. Slots may have a specific size (e.g., a length and a width), or they may be flexible in size. Slots may also include information indicating other slot parameters, such as the whether the slot is "above the fold" of the electronic communication (e.g., immediately visible to a consumer receiving the electronic communication without requiring a scroll operation for viewing), or the slot's relative position in the electronic communication (e.g., first, second third, etc.).

As used herein, the term "trending promotion" is intended to refer to electronic data or information that includes a reference sufficient to identify a particular promotion or promotion content by electronic circuitry, where that particular promotion is identified based at least in part on consideration of a velocity metric associated with the particular promotion. For example, trending promotions may include a response to an API request for a trending promotion, where that API request includes an electronic identifier for a particular promotion maintained by a promotion and marketing service. In some embodiments, trending promotions may include a particular set of promotion content (e.g., an image, a text string, an audio file, or the like) in addition to or as an alternative to a promotion identifier. In some embodiments, the trending promotion may require a database lookup to be performed using a unique identifier or other value included in the trending promotion to identify the particular promotion that is the subject of the trend. For example, a trending promotion provided to a slot manager or content generator may provide a promotion identifier as stored in a promotion database, and the receiving slot manager or content generator may use the promotion identifier to look up promotion components of the particular promotion identified by the promotion identifier.

In some embodiments, the trending promotion may include some, any, or all information stored in a promotion database and associated with a particular promotion. For example, the trending promotion may include electronic data indicating the terms and conditions of the promotion, offering parameters for the promotion, redemption parameters of the promotion, and/or any other promotion components associated with a recommended promotion. A trending promotion may, in some embodiments, include references to a plurality of promotions. It should be noted that, although embodiments are generally described with respect to identification of a particular promotion as trending, additional or alternative embodiments may identify groups of promotions, promotion types, promotion categories, or the like as trending, as respond to a trending promotion inquiry with electronic data indicating such groups of promotions, promotion types, or promotion categories.

As used herein, the term "velocity metric" is intended to refer to electronic data generated as a result of the analysis of transaction data associated with a particular promotion or set of promotions. In the present context, the velocity metric refers to any sales metric that may be employed to evaluate the change in a rate of transactions over two or more defined periods of time. In particular, embodiments may use embodiments to determine a difference in velocity metrics over particular time periods. For example, some embodiments may utilize a velocity metric corresponding to sales on particular days, hours, or weeks, so as to identify day over day, hour over hour, or week over week increases or decreases in sales of a particular promotion. It should be appreciated that any particular defined period of time may be used for evaluation of the velocity metric, and discussions relating to day over day evaluation are not intended to be limiting. Embodiments may further utilize multiple sets of defined time period data, such as three or more defined time periods for evaluation of a velocity metric.

As used herein, the term "trending promotion inquiry" is intended to refer to electronic data received or generated by a system, device, or apparatus that indicates that the system, device, or apparatus, should provide a trending promotion. Trending promotion inquiries may include various forms of electronic data, including but not limited to API requests.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

As noted above, one of the primary functions of a promotion and marketing service is to select content to be provided to consumers through electronic marketing communications. By carefully selecting content that is likely to be of interest to consumers for inclusion in electronic marketing communication, the promotion and marketing service maximizes the chance that a given electronic marketing communication will generate a sale. However, poor selection processes and improperly configured devices for identifying promotions to be provided to consumers may reduce the accuracy of identified promotions, thus reducing the marketing benefit achieved from electronic marketing communications. Furthermore, content that is sent to consumers consumes resources of both the promotion and marketing service and consumer devices, cluttering communication systems (e.g., e-mail or text message in-boxes) and consuming bandwidth and processor resources. Additionally, implementation of promotion identification systems into components of the promotion and marketing service may require substantial resources for integration and testing. When a change is made to a promotion identification system, it may be necessary to individually update each component that uses a version of the trending promotion identification system.

In response to these problems and other problems, the inventors have identified improved methods and apparatus for identifying promotions based on identification of trending promotions. In particular, the inventors have recognized that, by analyzing electronic data associated with transactions performed using a promotion and marketing service, promotions that have recently become popular or otherwise dramatically increased in consumer interest may be identifiable. The inventors have further recognized that such electronic data is a reasonable indicator of promotions that other consumers may find interesting. In this manner, the inventors have developed methods and systems that monitor and analyze promotion transactions to identify "trending" promotions that are newly popular with other users. In particular, the inventors have developed specific techniques for identifying these trending promotions from electronic marketing information, such as transaction data, and filtering promotions to ensure promotions identified as "trending" are of use to consumers when included in electronic marketing communications.

Additionally, the inventors have identified specific problems related to identifying "trending" promotions in the context of a promotion and marketing service. Since promotion and marketing services tend to offer limited promotion quantities, the inventors have realized that, in some embodiments, identifying trending promotions may result in frequent identification of trending promotions which are sold out or nearly sold out. Furthermore, since promotions offered by promotion and marketing services are often related to local merchants without a national presence, the inventors have identified that identification of promotions based on transaction data may result in identification of promotions with a location far away from the consumer receiving an electronic marketing communication suggesting the promotion. Additionally, since promotions offered by promotion and marketing services frequently have a short expiration timer or expected life, the inventors have determined that previously known techniques for identification of promotions may result in identification of promotions that have expired or are about to expire.

In response to these problems and other problems, the inventors have identified methods and apparatuses for identifying trending promotions based on velocity metrics. The inventors have further developed techniques for analyzing and filtering promotions identified based on the velocity metrics to ensure that promotions identified as trending are useful in the context in which said trending promotions are provided to consumers, such as by taking into account remaining quantities, expiration time, or an associated location. Embodiments of the present invention are therefore related to methods, systems, devices, apparatuses, and the like for identifying trending promotions based on analysis of electronic marketing information. In particular, embodiments utilize transaction data processed by a promotion and marketing service to identify trending promotions based on velocity metrics associated with those promotions. Embodiments further provide improved frameworks for providing these trending promotions for use in electronic marketing communications. In this manner, embodiments allow for accurate identification of trending promotions, resulting in the need to send fewer electronic marketing communications to achieve the same overall marketing benefit. As such, embodiments provide for improved efficiency of processor, network, and memory resources due to the ability to achieve the same, similar, or improved results with fewer outgoing electronic marketing communications. Furthermore, embodiments may provide a simplified framework for providing trending promotions, allowing other electronic system components to request and receive trending promotions in a flexible, straightforward manner. This framework may reduce the testing, development, and maintenance resources required to implement trending promotion identification systems in said electronic system components by replacing integrated trending promotion identification engines with an interface to the trending promotion identification framework.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to identify trending promotions for use in electronic marketing communications as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, promotion management circuitry 210, trending promotion determination circuitry 212, and slot manager circuitry 214. The apparatus 200 may be configured to execute the operations described above with respect to FIG. 1 and below with respect to FIGS. 4-7. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The promotion management circuitry 210 includes hardware configured to generate, provide, and manage promotions offered by a promotion and marketing service. The promotion management circuitry 210 may be configured to receive a request from a merchant to generate a new promotion and, in response to the request, facilitate the offering of the new promotion via the promotion and marketing service. In some embodiments, the promotion management circuitry 210 may be further configured to programmatically and/or automatically provide, offer, or generate promotions in response to the occurrence of a criterion or criteria. For example, a merchant may define a particular set of criteria that cause the promotion management circuitry 210 to offer a particular promotion or promotions. The promotion management circuitry 210 may manage promotions stored in a memory, such as the memory 204, and store promotions in the memory in response to the promotion being newly generated. In some embodiments, the promotion management circuitry 210 may dynamically control the offering parameters for a promotion or promotions in response to the occurrence of the set of criteria. The promotion management circuitry 210 may utilize processing circuitry, such as the processor 202, to perform these actions. The promotion management circuitry 210 may receive the request and/or otherwise communicate with a merchant device via a network interface provided by the communications circuitry 208. However, it should also be appreciated that, in some embodiments, the promotion management circuitry 210 may include a separate processor, specially configured field programmable gate array (FPGA), or application specific interface circuit (ASIC) to manage the offering of promotions via a promotion and marketing service. The promotion management circuitry 210 is therefore implemented using hardware components of the apparatus configured by either hardware or software for implementing these planned functions.

The trending promotion determination circuitry 212 includes hardware configured to manage, store, process, and analyze electronic marketing information to identify trending promotions based on velocity metrics. The trending promotion determination circuitry 212 may be configured to receive electronic marketing information via various sources, such as through a network interface provided by the communications circuitry 208, and to analyze the electronic marketing information to generate velocity metrics for promotions using processing circuitry, such as the processor 202. The trending promotion determination circuitry 212 may further use the generated velocity metrics to identify trending promotions using the processing circuitry, such as the processor 202. The trending promotion determination circuitry 212 may further interface with a storage device, such as the memory 204, to obtain the electronic marketing information used to identify the trending promotions. The trending promotions may be provided via a communications interface, such as provided by the communications circuitry 208.

The trending promotion determination circuitry 212 may also be configured to implement a trending promotion identification framework for providing trending promotions in response to requests from other components of a promotion and marketing service. In particular, the trending promotion determination circuitry 212 may be configured to access and analyze consumer transactions performed with the promotion and marketing service and/or one or more merchants to identify velocity metrics relating to transactions performed related to particular promotions over a plurality of time periods. These velocity metrics may be employed by the trending promotion determination circuitry 212 to identify trending promotions. An example data flow within and throughout an example trending promotion identification framework such as may be provided by or in conjunction with the trending promotion determination circuitry 212 is described further below with respect to FIG. 4.

The trending promotion determination circuitry 212 may also be operable to filter and curate trending promotions. For example, the trending promotion determination circuitry 212 may ensure that trending promotions are of a minimum quantity or quality, have a minimum remaining lifetime, or meet various other criteria. Example embodiments of operations that may employ trending promotion determination circuitry 212 to identify trending promotions are described further below with respect to FIGS. 4-5.

The slot manager circuitry 214 includes hardware configured to assign content generators and/or content to particular portions of an electronic marketing communication. The slot manager circuitry 214 may be configured to assign content generators and/or content to particular portions or "slots" of an electronic marketing communication or electronic marketing communication template to be used to generate electronic marketing communications that are transmitted by a promotion and marketing service. The slot manager circuitry 214 includes processing circuitry configured to assist with selection and assignment of content generators and/or content to particular slots of the electronic marketing communication. In some embodiments, the slot manager circuitry 214 interacts with the trending promotion determination circuitry 212 to request trending promotions. For example, the slot manager circuitry 214 may make requests, either for the slot manager circuitry 214 directly or on behalf of one or more content generators, via an interface, bridge device, API, or the like to send a trending promotion inquiry to the trending promotion determination circuitry 212.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions. Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

In particular, embodiments of the present invention may leverage knowledge of the server 302 of previous promotion purchases to generate velocity metrics for promotions and to identify trending promotions based on those velocity metrics. To this end, the server 302 may maintain records of past transactions (e.g., transaction data). In the context of the present disclosure, a "transaction" may be understood to represent an interaction between a particular consumer and the promotion and marketing service with respect to a particular promotion offered by the promotion and marketing service. Embodiments may be generally described herein where the transaction is a promotion purchase transaction, where a consumer receives or is provided with access to a promotion in exchange for something of value. However, it should also be understood that the techniques described herein could also be applied to alternative forms of transactions, such as impressions by the consumer of web pages associated with particular promotions, views of promotions provided to consumers via an application associated with the promotion and marketing service, and/or any other interaction which may indicate a relationship between a particular consumer and a particular promotion via the promotion and marketing service. These transactions may be analyzed to generate a set of velocity metrics related to the transactions. Based on the velocity metrics, the server 302 may generate and provide lists of trending promotions to indicate to consumers which promotions are in demand and/or recently popular with other consumers.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by improving the quality of electronic marketing communications transmitted from the server 302 to the consumer devices 304 by identifying trending promotions for inclusion in said electronic marketing communications. In this manner, embodiments offer improvements to the methods by which particular promotions are selected for as trending and improvements to the methods for which velocity metrics are calculated to select those trending promotions. In particular, embodiments provide improved techniques for evaluating transaction data over a plurality of time periods to identify the velocity metrics, along with sophisticated evaluation and filtering techniques to ensure that promotions identified as trending are available, valid, useful, and/or of interest to consumers. These improvements serve to reduce the number of electronic marketing communications that must be sent by the server 302 in order to produce sales, conserving system resources. Furthermore, by providing more accurate identification of trending promotions, the consumer may gain the same benefit with less system interaction, thus conserving system resources and improving the technical functionality of both the consumer devices 304 and the server 302.

Example Interactions Among a Trending Promotion Identification Framework and Various Components of a Promotion and Marketing Service FIG. 4 illustrates an example data flow interaction between a trending promotion identification framework 402 and components of a promotion and marketing service in accordance with some example embodiments of the present invention. The trending promotion identification framework 402 may communicate with other components of a promotion and marketing service in order to provide trending promotions for use in electronic marketing communications. In the present example, the trending promotion identification framework 402 is operable to receive trending promotion inquiries from a variety of sources and interact with a set of databases (e.g., information stored in a memory or memories, such as the memory 204 described above with respect to FIG. 2.) to generate a set of velocity metrics and to identify one or more trending promotions based on the velocity metrics.

The trending promotion identification framework 402 may be provided by a server such as described above with respect to FIGS. 1, 2, and 3. As noted above, the trending promotion identification framework may be provided by one or more components and/or specially configured circuitry. As noted above, trending promotion determination circuitry 212, such as described above with respect to FIG. 2, may provide some or all of the functionality as described herein with respect to the trending promotion identification framework 402. Data utilized by the trending promotion identification framework 402 may be received via a network interface such as provided by communications circuitry 208, and stored via a memory such as provided by the memory 204 as described above with respect to FIG. 2. The trending promotion identification framework 402 may further interface with promotion management circuitry 210 to assist with the generation, management, and monitoring of promotions offered by a promotion and marketing service as described above with respect to FIG. 2.

The trending promotion identification framework 402 may provide trending promotions in response to trending promotion inquiries received from various different sources. The present example illustrates a first example 404, a second example 406, and a third example 408 of the different manners in which trending promotion inquiries may be received and processed by the trending promotion identification framework 402.

The first example 404 illustrates a trending promotion inquiry generated by a slot manager 424 on behalf of a content generator. The slot manager 424 may be implemented by or in conjunction with slot manager circuitry 214 as described above with respect to FIG. 2. In the first example 404, the slot manager 424 receives a request to generate an electronic marketing communication from an external application 422. In response to the request, the slot manager 424 selects one or more content generators 426 to be used in generation of the electronic marketing communication. Upon selection of the content generators, the slot manager 424 may receive one or more content requests or other information relating to selection of a promotion for inclusion in the electronic marketing communication. In some embodiments, the content request or other information may indicate to the slot manager 424 that the slot manager 424 should obtain a trending promotion. In such a case, the slot manager 424 may generate a trending promotion inquiry to be sent to the trending promotion identification framework 402 via a trending promotion identification API 416.

The second example 406 illustrates a scenario in which a trending promotion inquiry is received directly from a content generator 428 without using a slot manager 430 as a go-between. In the second example 406, a slot manager 430 has selected one or more content generators 428 to generate an electronic marketing communication. After selection by the slot manager 430, the content generator 428 may be responsible for providing content to the slot manager for insertion into the electronic marketing communication. To obtain such content, in some embodiments the content generator 428 may generate a trending promotion inquiry that is sent to the trending promotion identification framework 402 via the trending promotion identification API 416.

The third example 408 illustrates a scenario in which a trending promotion inquiry is transmitted directly to the trending promotion identification framework 402 by an external application 432. The third example 408 thus illustrates a case in which, for example, a website requests a set of trending promotions for display without using an intermediary such as a slot manager. It should be appreciated that the external application 432 may have one of many different types. For example, the external application 432 may include a server hosting a consumer-specific web page (e.g., a web page dynamically populated with content based on discernible attributes of the viewer), a static web page, an automated marketing e-mail generation application, or the like. The external application 432 may send a trending promotion inquiry to the trending promotion identification framework 402 using the trending promotion identification API 416.

The trending promotion identification API 416 may refer to any component of the trending promotion identification framework 402 operable to receive a trending promotion inquiry. As described herein, example embodiments of the trending promotion identification framework may include an application programming interface defining particular functions and data values to be passed to the trending promotion identification framework 402 for the purpose of requesting trending promotions. It should also be appreciated however, that some embodiments of the trending promotion identification framework 402 may include alternative methods, processes, and components for providing an interface for requesting trending promotion other than an API. For example, embodiments may include a particular network messaging format for communicating with a specially configured device or apparatus for the purpose of requesting trending promotions that is not provided as part of an API.

The trending promotion identification API 416 may receive the trending promotion inquiry and notify an analytics engine 420 of the nature and/or contents of the trending promotion inquiry. The analytics engine 420 may function to extract relevant portions of the trending promotion inquiry, analyze the extracted portions in conjunction with a set of data including velocity metrics for a plurality of promotions, select one or more trending promotions based on the velocity metrics, and provide the selected trending promotions back to the trending promotion identification API 416 for transmission in reply to the trending promotion inquiry.

In this regard, the analytics engine 420 may receive information on past consumer transactions from a consumer transaction information database 412. The consumer transaction information database 412 may include data identifying which consumers have purchased which promotions, when the promotions were purchased, the cost of said purchases, the type of promotions purchased, the redemption of purchased promotions, and/or any other information relating to particular consumer transaction activities and promotions. Using the consumer transaction information, the analytics engine 420 may generate a set of velocity metrics which may be employed to evaluate which promotions should be identified as trending promotions. Based on these velocity metrics, the analytics engine 420 may select one or more promotions as trending promotions. For example, the analytics engine 420 may select promotions that have velocity metrics that exceed particular thresholds as trending promotions.

The analytics engine 420 may also communicate with a promotion interface 418 to access a promotion database 410. The promotion interface 418 may include components operable to provide information to the analytics engine 420 stored in the promotion database 410 regarding current and past promotions offered by a promotion and marketing service, including but not limited to quantities available, expiration dates, prices, and the like. The analytics engine 420 may use information provided by the promotion interface 418 to identify particular trending promotions and for filtering of promotions to ensure that trending promotions are not expired, unavailable, low on inventory, or otherwise invalid. Example embodiments of methods, processes, and operations of a trending promotion identification framework are described further below with respect to FIG. 5.

Example Process for Identifying Trending Promotions

Turning now to FIG. 5, example operations for identifying trending promotions are illustrated from the perspective of a promotion and marketing service that incorporates a trending promotion identification framework. The operations illustrated in FIG. 5 may, for example, be performed by elements of the promotion and marketing service 102 (e.g., server 104) described with respect to FIG. 1, with the assistance of, and/or under the control of one or more devices, such as apparatus 200. In particular, embodiments of a process 500 may be performed by trending promotion determination circuitry 212 as described above with respect to FIG. 2. The trending promotion identification circuitry 212 may provide means for performing the various actions described with respect to the process 500.

FIG. 5 depicts a process 500 that may be employed to identify trending promotions based on velocity metrics. The trending promotions identified by the process 500 may be employed in a variety of contexts and for a variety of purposes. In particular, embodiments may utilize trending promotions to generate electronic marketing communications that are transmitted to consumers for the purpose of providing marketing services by a promotion and marketing service.

At action 502, promotion transaction data is received. As indicated above, the promotion transaction information may include electronic data that identifies consumers and promotions associated with transactions performed via a promotion and marketing service. For example, every time a consumer exchanges currency or other items of value for a promotion, the promotion and marketing service may store information indicating which consumer received the promotion, which promotion was received, the amount of value (e.g., the price in currency or credit) exchanged for the promotion, the type of promotion, and/or various other data. The promotion transaction data may thus provide a record of when the transactions were performed, which promotions were purchased by which consumers, and various other metadata relating to the transaction(s). In some embodiments, consumer data may be aggregated or anonymized. For example, some embodiments may provide the consumer the ability to "opt out" of having their particular transaction data used for personalized marketing recommendations or trending promotions, though some embodiments may utilize aggregated data or data that otherwise has consumer identification information redacted to provide trending promotions. In some embodiments, transaction information may be linked to particular consumer characteristics, such as consumer age, location, or the like rather than particular individual consumers.

The promotion transaction data may be received from a billing component or e-commerce component of the promotion and marketing system. Additionally or alternatively, the promotion transaction data may be stored in a database that is accessible by a trending promotion identification framework or other system configured to retrieve the promotion transaction data. In some embodiments, trending promotion determination circuitry, such as the trending promotion determination circuitry 212 described above with respect to FIG. 2, provides a means for receiving the promotion transaction data. In some embodiments, the trending promotion determination circuitry acts in conjunction with a network interface, such as provided by the communications circuitry 208 described above with respect to FIG. 2 to provide a means for receiving the promotion transaction data.

At action 504, promotion velocity metrics are determined based on the transaction data. Promotion velocity metrics may include a variety of statistical data derived from transactions performed between the consumer and a promotion and marketing service, and these metrics may be calculated in a variety of ways. In particular, the promotion velocity metrics relate to transactions performed with respect to particular promotions over particular time periods. For example, velocity metrics may relate to the quantity of a particular promotion sold day over day, over a period of multiple days, or the like. Velocity metrics may relate to multiple individual time periods. For example, a velocity metric may identify a relationship between a quantity of promotions sold on a particular day to the quantity of the same promotion sold on the previous day.

In some embodiments, promotion velocity metrics may be calculated for each promotion. In other embodiments, constraints may be imposed on the calculation of promotion velocity metrics. For example, velocity metrics may not be calculated for promotions that had no sales on the previous day, for promotions that have had no sales in a previous number "n" days, or the like. In some embodiments, velocity metrics for promotions that do not meet certain criteria are set to a fixed value, such as zero.

In some embodiments, velocity metrics are calculated by listing all eligible promotions along with a number of transactions (e.g., sales, impressions, total orders, gross revenue derived from the promotion, or the like) for each of a plurality of time periods (e.g., each day) going back for a certain number of time periods (e.g., 3 days). Promotions that do not have at least a certain number of sales may be eliminated from calculation of a velocity metric (e.g., if the promotion does not have at least "n" sales on a particular day or days, it may be excluded). Embodiments may also utilize weighting parameters, such as values "alpha" and "beta" which are used to weight a number of promotions sold on particular days. For example, some embodiments may apply a business rule to select promotions where at least a certain quantity of units on a particular day (e.g., day "x−1") is greater than "alpha" multiplied by a number of units sold on the previous day (e.g., day "x−2"). Additional embodiments may also ensure that only promotions for which the number sold on a second day (e.g., day "x") is greater than "beta" multiplied by the quantity of promotions sold on the day previous to the second day (e.g., day "x−1"). In some embodiments, the value of alpha may be "1.1" and the value of beta may be "1.2".

In some embodiments, the velocity metrics identify a rate of change in engagement over a period of time. For example, the velocity metrics may utilize a set of data points reflecting the time period in which the promotion was available, and identify changes in those data points over time. In this manner, some embodiments may use a velocity metric corresponding to the slope of a line between points on a line graph, where the x axis of the line graph corresponds to the time periods being analyzed and the y axis corresponds to the number of transactions (e.g., sales) of the promotion in each time period. As such, a sharp increase in the number of sales over two days would result in a peak in the graph and a corresponding high line slope and therefore a high velocity metric, while steady day-over-day sales would result in a plateau and a low slope and a low velocity metric, and a decrease in sales day-over-day would result in a negative slope and a negative velocity metric.

In some embodiments, the velocity metrics may be dynamically defined based on knowledge of the promotions. For example, the number of time periods used to calculate the velocity metrics may be determined based on the expected lifetime of the promotion (e.g., a promotion with an expected 7 day life span may use a velocity metric configured to look at less than 6 days or less of data, while a promotion with an expected life span of 4 days may use a velocity metric with an expected life span of 3 days or less). Embodiments may include mechanisms for dynamically determining promotion life spans based on analytics derived from transaction data. For example, embodiments may examine promotion inventory levels over time for particular promotions, promotion types, promotion categories, or the like, to determine expected lifetimes.

The velocity metrics may be determined by means for determining velocity metrics, such as the trending promotion determination circuitry 212 described above with respect to FIG. 2. An example embodiment of a process for calculating the promotion metrics is described further below with respect to FIG. 6.

A trending promotion inquiry may be received at action 506. It should be appreciated that although the instant example embodiments describe receipt of a trending promotion inquiry after receiving velocity metrics and before determining trending promotions, that receiving of the trending promotion inquiry could occur any time prior to, during, or after identifying the trending promotions. While some embodiments may identify trending promotions, rank trending promotions, or otherwise take certain actions in response to receiving a trending promotion inquiry, other embodiments may identify the trending promotions, generate velocity metrics, or perform various steps of the process independently from or in parallel with receiving the trending promotion inquiry.

It should be appreciated that in some embodiments, velocity metrics may be generated in an "offline" manner, where the velocity metrics are generated prior to receiving a trending promotion inquiry. In such embodiments, the velocity metrics may be generated at periodic intervals (e.g., once per day, once per week, or the like), or based on particular events. For example, velocity metrics may be generated or updated every time a certain number of transactions are performed by a promotion and marketing service, every time a new promotion is added to the promotion and marketing service, every time sufficient system resources exist to review or revise the velocity metrics without impacting other functionality of a promotion and marketing service, every time definitions for the velocity metrics are updated, or any other scenario.

Some embodiments may employ a hybrid rationale for calculating velocity metrics or identifying trending promotions. Such embodiments may generate a set of velocity metrics at a particular interval, and update the velocity metrics at the time of receiving a trending promotion inquiry.

As noted above, the trending promotion inquiry may include electronic data received from a variety of sources in a variety of formats. The trending promotion inquiry may include a request for a trending promotion initiated an external source, such as a slot manager, content generator, or other application or system. The trending promotion inquiry may include electronic data sufficient to identify a number of requested trending promotions, a type of requested trending promotion, or any other details or constraints related to the request generated by the external source. It should be appreciated that in some embodiments the trending promotion inquiry may be initiated by another component of the same device or system that provides the trending promotion identification framework, while in other embodiments the trending promotion inquiry may be initiated by another device or system located internally or externally to a promotion and marketing service. The trending promotion inquiry may be received by means for receiving a trending promotion inquiry, such as trending promotion determination circuitry 212 as described above with respect to FIG. 2, or trending promotion determination circuitry 212 acting in conjunction with communications circuitry 208 as described above with respect to FIG. 2.

At action 508, one or more trending promotions are identified based on the velocity metrics. Determination of the trending promotion may include identifying one or more promotions based on the velocity metrics. In some embodiments, minimum thresholds are identified for the velocity metrics. For example, a promotion may have to have a minimum velocity metric associated with increased sales over time, a velocity metric indicating a particular rate of increase, and/or a velocity metric indicating a certain minimum number of sales on each day of a predefined time period in order to be identified as a trending promotion. The trending promotions may be determined by means for determining trending promotions, such as the trending promotion determination circuitry 212 described above with respect to FIG. 2.

At action 510, the trending promotions are filtered to remove invalid promotions. As noted above, promotions may have limited quantities, promotions may have particular expiration dates, promotions may only be offered for a limited time, promotions may only be offered in particular locations, promotions that have been previously identified as trending on a previous day, and the like. All of these factors may result in certain trending promotions being invalid for particular circumstances. For example, a given promotion may have exceptionally high velocity metrics but a low inventory level. If such a promotion were identified as a trending promotion, identification would likely have little overall effect on sales since the promotion was on a trajectory to sell out whether or not it was identified as trending. Some embodiments may filter based on a threshold inventory level, such that only promotions with a certain inventory level are eligible for identification as trending promotions (e.g., 5% inventory remaining, 10% inventory remaining), and other promotions are filtered out as invalid. As such, some embodiments may identify promotions as trending or otherwise filter selection of trending promotions based on whether a promotion is likely to sell through its available quantity before expiration, whether the promotion is near expiration, or the like. Filtering of the trending promotions may be performed by means for filtering trending promotions, such as the trending promotion identification circuitry 212 described above with respect to FIG. 2.

At action 512, the trending promotions are provided in response to the trending promotion inquiry. In some embodiments, the trending promotion inquiry may specify a certain number of requested trending promotions. For example, an external application may request five trending promotions for a particular electronic marketing communication being generated for a particular consumer. Alternatively, a "top 10" trending promotions may be requested in the trending promotion inquiry, and ten trending promotions may be provided. The trending promotions may be provided to the requesting entity by means for providing the trending promotions, such as the trending promotion determination circuitry 212 or the trending promotion determination circuitry 212 acting in conjunction with the communications circuitry 208 as described above with respect to FIG. 2.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A non-transitory computer readable storage medium comprising program instructions that, when executed by a processor, configure the processor to cause an apparatus to:
   perform, via a promotion and marketing service, at least one electronic transaction between a consumer and the promotion and marketing service to offer, via the electronic transaction, at least one promotion to the consumer, the at least one promotion offered for purchase such that upon purchase of the at least one promotion, an instrument is issued to the consumer that may be used toward at least a portion of a future purchase of one or more of goods, services, and experiences defined by the promotion;
   store a set of transaction data in a memory, the set of transaction data comprising electronic data indicating the at least one transaction;
   determine a number of particular time periods for use in determining one or more velocity metrics for each promotion of a plurality of promotions from the set of transaction data, wherein the number of particular time periods is less than a number of time periods of an expected lifetime of the promotion;
   determine the one or more velocity metrics for each promotion of the plurality of promotions, wherein the one or more velocity metrics comprise a change in a rate of previously performed transactions associated with the promotion over the number of particular time periods, and wherein a particular time period comprises one or more of day over day, hour over hour, or week over week increases or decreases in transactions associated with the promotion;
   determine a plurality of trending promotions from the plurality of promotions based on the velocity metrics, wherein a promotion is identified as a trending promotion in response to the promotion having a change in a rate of transactions greater than a threshold value, wherein the plurality of trending promotions represents a subset of the plurality of promotions;
   filter the plurality of identified trending promotions to remove invalid promotions, wherein filtering the plurality of identified trending promotions further comprises removing those promotions that are determined to be likely to sell through available quantity before an expiration of the promotion, and those promotions that are near an expiration of the promotion;
   generate an electronic communication for display via a client device associated with the consumer, the electronic communication comprising at least one trending promotion from the plurality of identified trending promotions; and transmit the electronic communication to the client device.

2. The computer readable storage medium of claim 1, wherein the program instructions further cause the processor to configure the apparatus to determine the at least one trending promotion based at least in part on the at least one trending promotion being associated with at least one of a particular location or a particular promotion category.

3. The computer readable storage medium of claim 1, wherein the at least one trending promotion is determined in response to receiving a trending promotion inquiry.

4. The computer readable storage medium of claim 3, wherein the program instructions further cause the processor to configure the apparatus to provide the at least one trending promotion to an entity from which the trending promotion inquiry was received.

5. The computer readable storage medium of claim 1, wherein filtering the plurality of identified trending promotions further comprises removing one or more of those promotions having less than a certain inventory level.

6. The computer readable storage medium of claim 1, wherein the one or more velocity metrics comprise a change in a rate of transactions over one or more of two or more or three or more particular time periods.

7. The computer readable storage medium of claim 1, wherein the expected lifetime of the promotion is determined based at least in part on one or more of promotion inventory levels, promotion types, or promotion categories.

8. An apparatus for generating electronic communications comprising at least one processor and at least one memory storing instructions that, when executed by the at least one processor, cause the apparatus to:
perform at least one electronic transaction between a consumer and a promotion and marketing service to offer, via the electronic transaction, at least one promotion to the consumer, the at least one promotion offered for purchase such that upon purchase of the at least one promotion, an instrument is issued to the consumer that may be used toward at least a portion of a future purchase of one or more of goods, services, and experiences defined by the promotion;
store a set of transaction data in the memory, the set of transaction data comprising electronic data indicating the at least one transaction;
determine a number of particular time periods for use in determining one or more velocity metrics for each promotion of a plurality of promotions from the set of transaction data, wherein the number of particular time periods is less than a number of time periods of an expected lifetime of the promotion;
determine the one or more velocity metrics for each promotion of the plurality of promotions, wherein the one or more velocity metrics comprise a change in a rate of previously performed transactions associated with the promotion over the number of particular time periods, and wherein a particular time period comprises one or more of day over day, hour over hour, or week over week increases or decreases in transactions associated with the promotion;
determine a plurality of trending promotions from the plurality of promotions based on the velocity metrics, wherein a promotion is identified as a trending promotion in response to the promotion having a change in a rate of transactions greater than a threshold value, wherein the plurality of trending promotions represents a subset of the plurality of promotions;
filter the plurality of identified trending promotions to remove invalid promotions, wherein filtering the plurality of identified trending promotions further comprises removing those promotions that are determined to be likely to sell through available quantity before an expiration of the promotion, and those promotions that are near an expiration of the promotion;
generate an electronic communication for display via a client device associated with the consumer, the electronic communication comprising at least one trending promotion from the plurality of identified trending promotions; and
transmit, via communications circuitry, the electronic communication to the client device.

9. The apparatus of claim 8, further configured to determine the at least one trending promotion based at least in part on the at least one trending promotion being associated with at least one of a particular location or a particular promotion category.

10. The apparatus of claim 8, wherein the at least one trending promotion is determined in response to receiving a trending promotion inquiry.

11. The apparatus of claim 10, further configured to provide the at least one trending promotion to an entity from which the trending promotion inquiry was received.

12. The apparatus of claim 8, wherein filtering the plurality of identified trending promotions further comprises removing one or more of those promotions having less than a certain inventory level.

13. The apparatus of claim 8, wherein the one or more velocity metrics comprise a change in a rate of transactions over one or more of two or more or three or more particular time periods.

14. The apparatus of claim 8, wherein the expected lifetime of the promotion is determined based at least in part on one or more of promotion inventory levels, promotion types, or promotion categories.

15. A method for generating electronic communications, the method comprising:
performing at least one electronic transaction between a consumer and a promotion and marketing service to offer, via the electronic transaction, at least one promotion to the consumer, the at least one promotion offered for purchase such that upon purchase of the at least one promotion, an instrument is issued to the consumer that may be used toward at least a portion of a future purchase of one or more of goods, services, and experiences defined by the promotion;
storing a set of transaction data, the set of transaction data comprising electronic data indicating the at least one transaction;
determining a number of particular time periods for use in determining one or more velocity metrics for each promotion of a plurality of promotions from the set of transaction data, wherein the number of particular time periods is less than a number of time periods of an expected lifetime of the promotion;
determining the one or more velocity metrics for each promotion of the plurality of promotions, wherein the one or more velocity metrics comprise a change in a rate of previously performed transactions associated with the promotion over the number of particular time periods, and wherein a particular time period comprises one or more of day over day, hour over hour, or week over week increases or decreases in transactions associated with the promotion;

determining a plurality of trending promotions from the plurality of promotions based on the velocity metrics, wherein a promotion is identified as a trending promotion in response to the promotion having a change in a rate of transactions greater than a threshold value, wherein the plurality of trending promotions represents a subset of the plurality of promotions;

filtering the plurality of identified trending promotions to remove invalid promotions, wherein filtering the plurality of identified trending promotions further comprises removing those promotions that are determined to be likely to sell through available quantity before an expiration of the promotion, and those promotions that are near an expiration of the promotion;

generating an electronic communication for display via a client device associated with the consumer, the electronic communication comprising at least one trending promotion from the plurality of identified trending promotions; and transmitting the electronic communication to the client device.

16. The method of claim 15, further comprising determining the at least one trending promotion based at least in part on the at least one trending promotion being associated with at least one of a particular location or a particular promotion category.

17. The method of claim 15, wherein filtering the plurality of identified trending promotions further comprises removing one or more of those promotions having less than a certain inventory level.

18. The method of claim 15, wherein the one or more velocity metrics comprise a change in a rate of transactions over one or more of two or more or three or more particular time periods.

19. The method of claim 15, wherein the expected lifetime of the promotion is determined based at least in part on one or more of promotion inventory levels, promotion types, or promotion categories.

* * * * *